US008615057B2

(12) United States Patent
Li

(10) Patent No.: US 8,615,057 B2
(45) Date of Patent: Dec. 24, 2013

(54) METHOD AND DEVICE FOR MULTIPLE INPUT-MULTIPLE OUTPUT DETECTION

(75) Inventor: Min Li, Leuven (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 302 days.

(21) Appl. No.: 12/831,933

(22) Filed: Jul. 7, 2010

(65) Prior Publication Data

US 2011/0007851 A1 Jan. 13, 2011

Related U.S. Application Data

(63) Continuation of application No. PCT/EP2009/001615, filed on Mar. 6, 2009.

(60) Provisional application No. 61/034,741, filed on Mar. 7, 2008.

(51) Int. Cl.
*H04L 27/06* (2006.01)

(52) U.S. Cl.
USPC ........... 375/340; 375/262; 375/316; 375/322; 375/341; 375/343

(58) Field of Classification Search
USPC ......... 375/229, 259, 260, 262, 295, 316, 322, 375/324, 340, 341, 343
See application file for complete search history.

(56) References Cited

U.S. PATENT DOCUMENTS

| | | | | |
|---|---|---|---|---|
| 7,421,035 | B1 * | 9/2008 | Gardner et al. | 375/267 |
| 7,961,826 | B2 * | 6/2011 | Waters et al. | 375/347 |
| 8,259,882 | B2 * | 9/2012 | Son et al. | 375/348 |
| 2004/0083082 | A1 * | 4/2004 | Onggosanusi et al. | 703/2 |
| 2005/0135498 | A1 * | 6/2005 | Yee | 375/267 |
| 2007/0286063 | A1 * | 12/2007 | Aulin | 370/203 |
| 2008/0037677 | A1 * | 2/2008 | Ma et al. | 375/267 |
| 2009/0323795 | A1 * | 12/2009 | Stirling-Gallacher | 375/232 |
| 2010/0054372 | A1 * | 3/2010 | Eckert | 375/340 |
| 2012/0121047 | A1 * | 5/2012 | Jia et al. | 375/341 |

FOREIGN PATENT DOCUMENTS

WO   WO 2007/132016   11/2007

OTHER PUBLICATIONS

Barbero et al., Rapid Prototyping of a Fixed-Throughput Sphere Decoder for MIMO Systems, IEEE ICC 2006 Proceedings; 2006, pp. 3082-3087.

Garrett et al., Silicon Complexity for Maximum Likelihood MIMO Detection Using Spherical Decoding, IEEE Journal of Solid-State Circuits, vol. 34, No. 9, Sep. 2004, pp. 1544-2004.

Guo et al., A VLSI Architecture of the Schnorr-Euchner Decoder for MIMO Systems, IEEE 6th CAS Symp. On Emerging Technologies: Mobile and Wireless Comm., May 31-Jun. 2, 2004, pp. 65-68.

(Continued)

*Primary Examiner* — Hirdepal Singh
(74) *Attorney, Agent, or Firm* — Knobbe Martens Olson & Bear LLP

(57) ABSTRACT

A method and device for detecting a symbol transmitted over a communication channel in a multiple input-multiple output communication system are disclosed. In one aspect, the method includes receiving a symbol transmitted over a communication channel of a multiple input-multiple output communication system. The method may also include searching a subset of possible transmitted symbols, the subset having a predetermined size dependent on properties of the communication channel. The method may also include deciding to which symbol of the subset the received symbol corresponds.

18 Claims, 6 Drawing Sheets

(56) References Cited

OTHER PUBLICATIONS

Kailath et al., MIMO Receive Algorithms, Cambridge University Press, 2005, pp. 5-24.
Kang et al. Fast and Area-efficient Sphere Decoding Using Look-ahead Search, IEEE vol. 1550, 2007, pp. 2384-2388.
Lee et al. Parallel Architecture for Sphere Decoder with Runtime Constraint, IEEE vol. 1-4344 Jan. 2008, pp. 181-184.
Li et al. Adaptive SSFE Near-ML MIMO Detector with Dynamic Search Range and 80-103Mbps Flexible Implementation, IEEE vol. 978, 4244 2008 pp. 1-5.
Li et al. Optimizing Near-ML MIMO Detector for SDR Baseband on Parallel Programmable Architectures, EDAA, 978-3-9810801-3-1 2008 pp. 1-6.
Mei et al., Design Methodology for a Tightly Coupled VLIW/Reconfigurable Matrix Architecture: A Case Study, IEEE Proceedings of the Design, Automation and Test in Europe Conference and Exhibition, 2004, pp. 1-6.
Paulraj et al., An Overview of MIMO Communications—A Key to Gigabit Wireless, Proceedings of the IEEE, vol. 92, No. 2, Feb. 2004, pp. 198-218.
International Search Report mailed Dec. 22, 2009 in International Application No. PCT/EP2009/001615.

* cited by examiner

| Original | Transformed |
|---|---|
| generic slicing and p1;<br>if (nP>1){p2};<br>if (nP>2){p3,4};<br>if (nP>4){p5,...,8}; | if (nP>1){<br>   generic slicing and p1;<br>   p2;<br>   if (nP>2){p3,4};<br>   if (nP>4){p5,...,8};<br>} else {<br>   simple slicing and p1;<br>} |

METHOD AND DEVICE FOR MULTIPLE INPUT-MULTIPLE OUTPUT DETECTION

CROSS REFERENCE TO RELATED APPLICATIONS

This application is a continuation of PCT Application No. PCT/EP2009/001615, filed Mar. 6, 2009, which claims priority under 35 U.S.C. §119(e) to U.S. provisional patent application 61/034,741 filed on Mar. 7, 2008. Each of the above applications is incorporated herein by reference in its entirety.

BACKGROUND OF THE INVENTION

1. Field of the Invention

The present invention generally relates to a multiple input/multiple output system and method for detecting received symbols that can be used in a software defined radio context.

2. Description of the Related Technology

Although Moore's Law predicted a fast evolution of the semiconductor integration, the increment of silicon-capability has been rapidly exhausted by the explosion of signal processing complexity in wireless communications. In recent standards such as 802.11n, WiMAX and 3GPP LTE (long term evolution), the complexity-increments essentially come from the application of MIMO (multiple input multiple output) processing, with which the drastically increased throughput comes at the expense of a very complex MIMO detector. With SDM (spatial division multiplexing) transmissions, the major complexity-increment is in the MIMO detector.

Among existing MIMO detectors, the ML (maximum-likelihood) and near-ML detectors are superior to traditional linear detectors. In recent years, algorithmic optimizations and implementations of ML/near-ML detector have attracted lots of interest. Almost all of the implementations are delivered in ASIC (application specific integrated circuit) or FPGA (field programmable gate array).

With the exploding design and processing cost in the deep submicron era, the current trend is to implement as much possible baseband functionalities on programmable or reconfigurable platforms. Recently, tremendous research efforts have been investigated in both the industry and the academia for parallel programmable baseband architectures targeting mobile terminals.

The SDR (software defined radio) paradigm, which was mainly successful in the base station segment, is currently emerging also in the handset market. Especially, ILP (instruction level parallel) and DLP (data level parallel) architectures are becoming very prevailing. The first one, when implemented as VLIW processor, benefits from mature compilation technologies. With software pipelining, it is possible to achieve very efficient utilizations of parallel functional units. In the paper "Design Methodology for a Tightly Coupled VLIW/Reconfigurable Matrix Architecture: A Case Study" (B. Mei et al., Proc. of DATE 2004, pp. 1224-1229), similar compilation techniques are used to enable the C-language programming on CGA (coarse grain array) processors, bringing even higher parallelism. Theoretically, these latest developments in ILP and DLP architectures would allow the SDR implementation of complex signal processing algorithms such as near-ML detectors, at rates compatible with emerging wireless standards.

Unfortunately, none of the existing near-ML detectors fits well programmable architectures like ILP or DLP. Sphere decoders (see below) and most of its variants are essentially sequential and non-deterministic, so that the parallelization is difficult. On the other hand, although the K-Best, QRD-M (see below) and their variants have been realized in hardware implementations, they have a fundamental problem when mapping on parallel programmable architectures. The spanning-sorting-deleting process incurs irregular dataflow, non-deterministic control flow, extensive shuffling and extensive memory-rearrangement. These characteristics result in very low resource-utilizations on ILP and DLP architectures. If these problems are not eliminated at high-level, low-level compiler optimizations can hardly solve them.

A MIMO system is considered wherein $N_t$ different signals are transmitted and arrive at an array of $N_r$ ($N_t \leq N_r$) receivers via a flat-fading channel. With OFDM (orthogonal frequency division multiplexing) transmission such as that in IEEE 802.11n and 3GPP LTE (long term evolution), frequency-selective channels are converted to parallel flat fading channels. The MIMO detector is arranged to recover a transmitted vector signal from a received vector signal. Popular schemes include linear detection, SIC (successive interference cancelation) and ML/Near-ML detectors. Extensive surveys can be found in "An overview of MIMO communications-a key to gigabyte wireless" (H. Nabar et al., Proc. IEEE. v92, pp. 198-218).

Sphere Decoding (SD) is known for example from the paper "Silicon Complexity for maximum likelihood MIMO detection using spherical decoding" (D. Garrett et al., IEEE J. Solid-State Circuits, vol. 39, no. 9, pp. 1544-1552, September 2004). It solves the maximum likelihood detection problem by applying the QR (Orthogonal-Triangular) decomposition: H=QR, where Q is an orthogonal matrix and R is an upper triangular matrix.

Various depth-first searching algorithms have been proposed for sphere decoding. Most of these algorithms are depth-first serial tree-search. They are not suited for parallel programmable architectures such as VLIW, as they have a non-deterministic dynamism depending on the channel matrix and the SNR.

The sub-optimal K-Best (similar to QRD-M) and its variants perform breadth-first searching. The K-Best and variants are mostly ASIC-minded algorithms. Both strict sorting and approximating sorting have been proposed. K-Best involves modular and repetitive operations that are easily parallelized in hardware. However, K-Best has many problems on parallel programmable architecture:

(1) extensive shuffling operations;
(2) the execution is not deterministic and regular;
(3) intensive memory rearrangement is required;
(4) the complexity of the spanning-sorting-deleting process is still too high.

Consequently, there is a need for further improvement when implementing near-ML detectors on programmable architectures.

SUMMARY OF CERTAIN INVENTIVE ASPECTS

Certain inventive aspects relate to a method and system which allow near-ML multiple input multiple output (MIMO) detection which is optimized for parallel programmable architectures. Architecture friendliness is introduced from the very beginning of the design flow.

The method proposes the use of selective spanning with fast enumeration. The method for detection of a symbol transmitted over a communication channel in a MIMO system comprises the following steps. First a symbol transmitted over a communication channel is received. A subset of possible transmitted symbols is then searched, the subset having a predetermined size dependent on communication channel properties. This means the search width is predefined. Finally it is decided to which symbol of the subset the received symbol corresponds.

An advantageous platform to implement the method as described above, is the parallel programmable architecture of patent application WO2007/132016-A1, which is incorporated herein by reference.

In a preferred embodiment the step of searching comprises selecting the closest constellation to a point determined by the properties of the communication channel. This can be achieved by only using simple operations like additions, subtractions, shifting and bit operations.

In another preferred embodiment a plurality of symbols is received and the searching step for at least two received symbols is performed in parallel paths. The number of parallel paths is preferably adaptable. A number of received symbols can then be processed in parallel, whereby multiple trees are searched simultaneously. The parallelism offers the further advantage that it easily allows mapping on a VLIW, SIMD or vector architecture.

In an advantageous embodiment the multiple input-multiple output communication system is an OFDM system.

In yet another preferred embodiment the step of estimating a parameter providing an indication of the properties of the communication channel. The predetermined size is read from a lookup table after estimating that parameter.

The predetermined size of the subset is preferably a power of 2.

The properties of the communication channel are advantageously determined via an iterative approximate estimation process.

In another aspect the invention relates to a device for detecting a symbol transmitted over a communication channel in a multiple input-multiple output communication system. The device comprises means for receiving a symbol transmitted over the communication channel, searching means for searching a subset of possible transmitted symbols, whereby the subset has a predetermined size dependent on properties of the communication channels, and selection means for selecting the symbol of the subset to which the received symbol corresponds.

Preferably the device is further arranged for parallel processing.

The device advantageously also comprises storage means for storing at least the subset of possible transmitted symbols.

In a further embodiment the device comprises a run-time controller for dynamic adaptation of parameters in response to changed properties of the communication channel.

In an embodiment the device also comprises means for performing pre-compiler transformations.

Another inventive aspect relates to a multiple input-multiple output communication system, comprising a device as previously described.

DETAILED DESCRIPTION OF CERTAIN ILLUSTRATIVE EMBODIMENTS

Figure 1A:
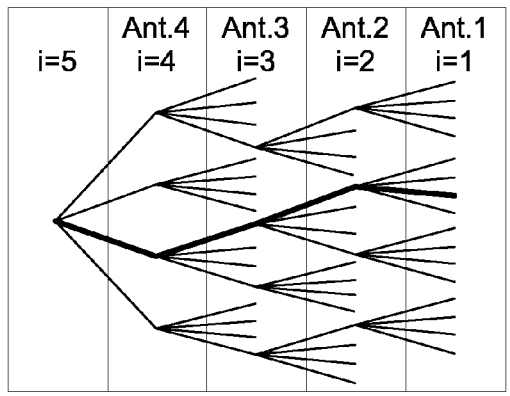
FIG. 1 illustrates the topology of trees in K-Best (a) and SSFE (b).

In order to bridge the algorithm-architecture gap for near-ML MIMO detectors, certain inventive embodiments relate to a scalable detector with explicit architecture-friendliness based on selective spanning with fast enumeration (SSFE). The SSFE allows for easy parallelization and efficiently mapping on programmable architectures, such as digital signal processors (DSPs) with VLIW (very long instruction word), SIMD (single instruction multiple data) or vector processing features. Moreover, to fully exploit the programmability and further speedup the detector, a run-time controller is designed to dynamically alternate parameters of the SSFE detector according to MIMO channel conditions, so that workload of the detector is minimized. In this way, the SSFE throughput is significantly improved.

First, a MIMO system is illustrated. Such a system can be viewed as transmitting an $N_t \times 1$ vector signal s through an $N_r \times N_t$ matrix channel H, with $N_r \times 1$ Gaussian noise vector n added to the received vector signal y, whereby the relation holds y=Hs+n. The MIMO detector is arranged to recover a transmitted vector s signal from a received vector signal y.

The ML detection is defined as $$\hat{s} = \arg\min_{s \in \Omega^{Nt}} \|y - Hs\|^2 \quad \text{(Eq. 1)}$$

where $\Omega^{Nt}$ is the set containing all the possibilities of $N_t \times 1$ vector signal s.

Near-ML detection is intended to mean that not all possible combinations in $\Omega^{Nt}$ are searched, but only a subset.

Sphere decoding (SD) solves the maximum likelihood detection problem by applying a QR (orthogonal-triangular) decomposition: H=QR, where Q is an orthogonal matrix and R is an upper triangular matrix. It can be shown that $$\|y-Hs\|^2 = c + \|\hat{y}-Rs\|^2, \hat{y}=Q^Hy \quad \text{(Eq. 2)}$$

where c is a constant.

A Nt+1 level spanning-tree can be constructed to solve Equation (1). The root-level is marked as i=Nt+1 and the leaf-level as i=1.

Each node at level i belonging to $\{2, \ldots, N_t+1\}$ is expanded to C nodes at level i−1, where C is the constellation size. Each node at level i of $\{1, 2, \ldots, N_t+1\}$ is uniquely described by a partial vector symbol $s^i = [s_i, \ldots, s_{Nt}]$, the leaves (level i=1) correspond to all possible vector-symbols $\Omega^{Nt}$.

Let the root node be annotated with $T_{Nt+1}=0$ and start from level $i=N_t$, the partial Euclidean distance (PED) of a partial symbol vector $s^i=[s_i, s_{i+1}, \ldots, s_{Nt}]$ is $T_i(s^i)=T_{i+1}(s^{i+1})+\|e_i(s^i)\|_2$, where the PED increment $\|e_i(s^i)\|^2$ is $$\|e_i(s^i)\|^2 = \left\| \hat{y}_i - \sum_{j=i}^{Nt} R_{ij} s_j \right\|^2 \quad \text{(Eq. 3)}$$

$\|e_i(s^i)\|^2$ is obviously non-negative, so that the PED increases monotonically from root to leaves. Hence, the expression in Eq. (2) has now been transformed into a tree-search to find the leaf at level i=1 with the minimal PED $T_1(s^1)$.

Various depth-first searching algorithms have been proposed for sphere decoding. Most of these algorithms are depth-first serial tree-search. They are not suited for parallel programmable architectures such as VLIW, as they have a non-deterministic dynamism depending on the channel matrix and the SNR.

For the various possible depth-first searching algorithms, the K-Best and variants are mostly ASIC-minded algorithms. They keep K best nodes on each level of the tree. When going from level i+1 to i, K-Best first spans the K nodes at level i+1 to KC nodes (C is the constellation size), then sorts the KC them with PED, the K best nodes are selected and the remaining nodes are deleted. The spanning-sorting-deleting process is repeated for $N_t$ times until reaching the leaf nodes.

In one embodiment, the key feature of the proposed algorithm is the completely deterministic and regular dataflow pattern and structure. Abundant vector-parallelism is enabled in the SSFE; memory rearrangement, shuffling operations and non-deterministic dynamism are all eliminated.

The SSFE can be uniquely characterized by a vector $m=[m_1, \ldots, m_{Nt}]$. This vector represents the number of nodes at each level to which each node at the preceding level is spanned. Starting from level $i=N_t$, SSFE spans each node at level i+1 to $m_i$ nodes at level i. The spanned nodes are never deleted. Hence, the total number of nodes at level i is $$\prod_{k=i}^{Nt} m_k.$$

If the node at level $i=N_t+1$ has the associated partial symbol vector being $s^{i+1}=[s_{i+1}, \ldots, s_{Nt}]$, the spanning is to select a set of $s^i=[s_i, s_{i+1}, \ldots, s_{Nt}]$ in the way that $\|e_i(s^i)\|^2$ is minimized. Essentially, the SSFE is a distributed-greedy-algorithm. It is greedy because it minimizes $\|e_i(s^i)\|^2$ at each level of the tree. In addition, it is distributed because the minimization of $\|e_i(s^i)\|^2$ is local for each node at level i+1 when spanning this node to $m_i$ nodes at level i.

Figure 1B:
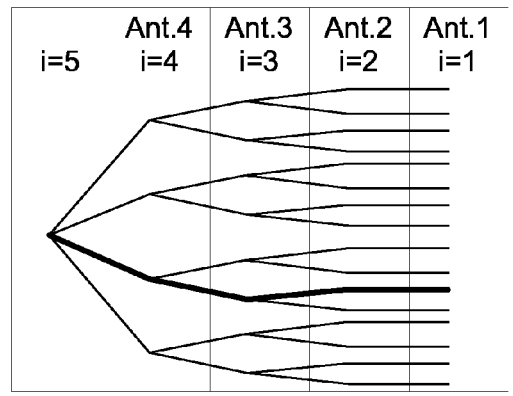

The topology of search-trees in the K-Best (as known in the prior art) and the SSFE (according to one embodiment) are compared in FIG. 1. FIG. 1(a) is for K-Best with K=4, whereas FIG. 1(b) is for the solution according to one embodiment employing SSFE with m=[1, 2, 2, 4]. The transmission is 4×4 QPSK. The bold lines mark the path and leaf with the minimal PED. Note that FIG. 1(a) is just one possible execution of the K-Best algorithm, which is essentially dynamic. On the contrary, the SSFE brings completely deterministic and regular dataflow structures. The SSFE is different from the fixed-complexity detectors in "Rapid Prototyping of a Fixed-Throughput Sphere Decoder for MIMO Systems" (Barbero et al., IEEE Int'l Conference on Communications (ICC '06), Istanbul, pp. 3082-3087), which is incorporated herein by reference, despite the similarities in the topology of the spanning-trees. First of all, in the present scheme a set of $s^i=[s_i, s_{i+1}, \ldots, s_{Nt}]$ is selected to minimize the increment $\|e_i(s^i)\|^2$ but not the partial Euclidian distance $T_i(s^i)$.

Second, sorting or deleting are not involved in the SSFE. On the contrary, in the K-Best algorithm, the spanning-sorting-deleting process is based on the PED ($T_i(s^i)$) of KC spanned nodes at level i. Hence, in the K-Best approach the sorting of $T_i(s^i)$ is performed globally on KC nodes, which are spanned from K different nodes at level i+1. Clearly, when KC is large huge amount of operations are required.

In contrast to the K-Best algorithm, the distributed and greedy algorithmic structure of the SSFE allows the application of architecture-friendly and efficient heuristics to minimize $\|e_i(s^i)\|^2$. The heuristic is called Fast Enumeration (FE). To derive the FE, first the PED increment as expressed in Eq. (3) is rewritten as $$\|e_i(s^i)\|^2 = \left\| \underbrace{\hat{y}_i - \sum_{j=i+1}^{Nt} R_{ij} s_j}_{b_{i+1}(s^{i+1})} - R_{ii} s_i \right\|^2 \quad \text{(Eq. 4)}$$

The minimization of $\|e_i(s^i)\|^2$ is equivalent to the minimization of $\|e_i(s^i)/R_{ii}\|^2$. Hence, from Eq. 4 is derived $$\|e_i(s^i)/R_{ii}\|^2 = \|\underbrace{b_{i+1}(s^{i+1})/R_{ii}}_{\xi_i} - s_i\|^2 \quad \text{(Eq. 5)}$$
$$= \|\xi_i - s_i\|^2$$

Eq. 5 gives the geometrical interpretation for minimizing $\|e_i(s^i)/R_{ii}\|^2$: minimizing Eq. 5 is essentially selecting the closest constellation to $\xi_i$. For SSFE, the FE is to select a set of closest constellations around $\xi_i$. Note that $\xi_i$ is determined by properties of the communication channel.

Instead of generating the set in an optimal way, heuristics are applied to approximate the enumeration. When the number of nodes at level 1, $m_i=1$, the closest constellation to is $\xi_i$ is $p_1=Q(\xi_i)$, where Q denotes the slicing operator that links $\xi_i$ to the closest constellation points. The slicing operation can be performed by means of only simple operations like additions, subtractions, shifting and bit operations. When $m_i>1$, more constellations can be efficiently enumerated based on the vector $d=\xi_i-Q(\xi_i)$. For $m_i \leq 4$, the points can be enumerated in the following way (with C-like syntaxes):

$\phi = \Re(d)|>|\Im(d)|$ $p_2=Q(\xi_i)+2(sgn(\Re(d))\phi+j(sgn(\Im(d))(!\phi)))$ $p_3=Q(\xi_i)+2(sgn(\Re(d))(!\phi)+j(sgn(\Im(d))\phi))$ $p_4=Q(\xi_i)+2(sgn(\Re(d))+j(sgn(\Im(d)))) \quad \text{(Eq. 6)}$ where 'sgn( )' is the operator for sign (positive/negative) and '!' the logic-not operator like that in the C programming language.

Figure 2:
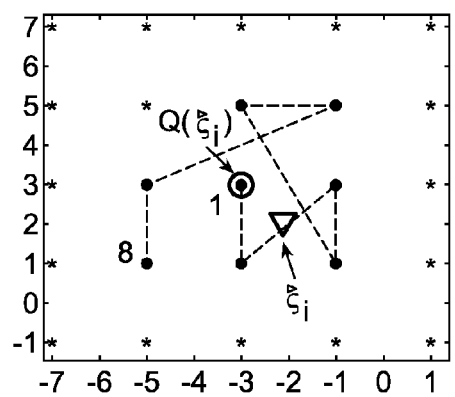
FIG. 2 illustrates an example of Fast Enumeration with 8 constellation points.

Fundamentally, the technique applied is to incrementally grow the constellation set around $\xi_i$ with efficient-heuristics based approximations. For example, if $|\Re(d)|>|\Im(d)|$, the second closest constellation ($p_2$) to $\xi_i$ is on the horizontal-line where $Q(\xi_i)$ stays, and the distance between $Q(\xi_i)$ and $p_2$ is $2(sgn(\Re(d))$. If $|\Re(d)|<|\Im(d)|$, $p_2$ is on the vertical line where $Q(\xi_i)$ stays, and the distance is $2j(sgn(\Im(d)))$. In order to avoid if-then statements and to make a deterministic dataflow in the enumeration, the expressions of $p_2$ are written as that in Eq. (6). Similarly, $p_3$ and $p_4$ are enumerated with simple operations. An example of an 8-points enumeration is shown in FIG. 2. The first point and the last point are annotated with numbers. More points can be enumerated in the same way. In practical implementations, one considers $m_i \in 1, 2, 4, 8, 16$ to simplify the address generation scheme on programmable architectures.

The fast enumeration (FE) has clear advantages over the PSK-like enumeration as implemented for example in "VLSI architecture of the Schnorr-Euchner decoder for MIMO systems", (Z. Guo and P. Nilsson, Proc. IEEE CAS Symp. Emerging Technol., 2004, pp. 65C68), which is incorporated herein by reference. The FE scheme in the SSFE is independent of the constellation size, so that handling 64-QAM is as efficient as handling QPSK. More importantly, the FE is based on very simple and architecture-friendly operators such as additions, subtractions, bit-not and shifts.

As shown in FIG. 1, the dataflow in the SSFE is completely deterministic and regular. Hence, it is simple to parallelize the SSFE for parallel programmable architectures. One can search multiple trees simultaneously. In one embodiment, this offers several advantages:

(1) It brings abundant vector-parallelism, which can be easily mapped on VLIW, SIMD or vector architectures;

(2) the parallelization is scalable, the number of parallel trees can be adapted to DSP architectures;

(3) this scheme perfectly fits OFDM and OFDMA systems, where the detection is essentially parallel for blocks of MIMO symbols.

The proposed SSFE detector according to one embodiment has operations and data-flow structures that are friendly to parallel programmable architectures, so that it can be easily and efficiently implemented (see below). So far, the constraints of architectures are well considered in the prior art, but the opportunities of programmable architectures are not fully exploited yet.

Since programmability is one of the most important design criterions, the multiplexing of data-path and memory on programmable architectures is much easier comparing to that in ASICs. On ASICs, highly flexible and dynamic design often incurs significantly increased design time and chip area, and full dynamic resource-multiplexing is difficult to realize. However, programmable architectures can handle highly flexible and dynamic algorithms very well. In an embodiment of this invention such advantage is leveraged to significantly speed up the SSFE detector implementation.

The receive vector $\hat{y}$ in Equation 2 can be rewritten as $\hat{y}=Q^H y=R s_{ZF}$, where $s_{ZF}$ is the zero-forcing solution (the unconstrained ML solution): $s_{ZF}=H^\dagger y$, whereby $H^\dagger$ is the pseudo-inverse of H. Hence, $\|\hat{y}-Rs\|^2=\|Rs_{ZF}-Rs\|^2=\|R(s_{ZF}-s)\|^2$ is minimized. This implies that the ML solution of Equation 1 is equivalent to searching s around $s_{ZF}$ with $\|R(s_{ZF}-s)\|^2$ minimized.

If the noise n in $y=Hs+n$ is an independent Gaussian random process with variance $\sigma_n^2$, the noise contained in the zero forcing solution $s_{ZF}$ is $w=H^\dagger n$ with covariance matrix $cov(w)=\sigma_n^2(H^H H)^{-1}$. With SVD decomposition $H=U\Sigma V$, the above covariance matrix can be rewritten as $$cov(w)=\sigma_n^2 V \Sigma^{-2} V^H \qquad (Eq. 7)$$

Since V and $V^H$ are both orthogonal matrices, the noise distortion and amplification properties of cov are determined by $\Sigma^{-2}$, the reciprocal square of the singular value matrix $\Sigma=\text{diag}([\sigma_{max}, \ldots, \sigma_{min}])$:

$$\sum\nolimits^{-2} = \frac{1}{\sigma_{max}^2}\begin{pmatrix} 1 & & \\ & \ddots & \\ & & \sigma_{max}^2/\sigma_{min}^2 \end{pmatrix} \qquad (Eq. 8)$$

It can be seen that the noise contained in $s_{ZF}$ is very sensitive to the numerical properties of the channel matrix H. Ill-conditioned channels with large $\sigma_{max}^2/\sigma_{min}^2$ bring along significant noise distortions and amplifications, which requires large search space when searching the ML solution. On the contrary, a well-conditioned channel introduces less noise distortions and amplifications, which implies that a small search space is enough. This motivates adjusting the vector m in the SSFE to reduce work load.

As a widely used metric for numerical properties, the condition number is defined as a parameter $\kappa=\sigma_{max}/\sigma_{min}$, so that $\kappa^2=\sigma_{max}^2/\sigma_{min}^2$. As discussed before, $\kappa^2$ (or $\kappa$) indicates the noise amplification and distortions. The vector m is dynamically regulated according to the condition number.

Figure 3:
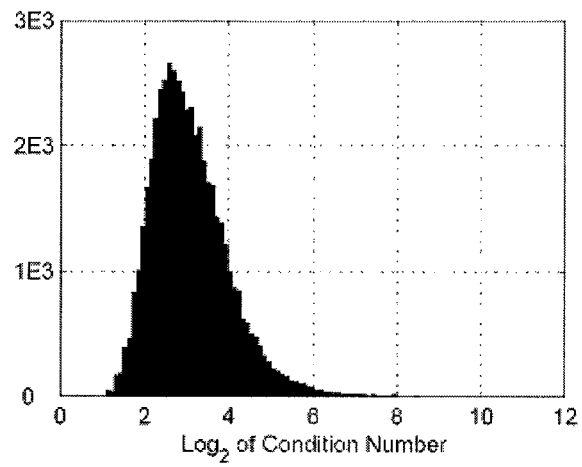
FIG. 3 illustrates a histogram of $\log_2(\kappa)$.

In order to verify that $\kappa$ is a good indication for the decision on the searching space in ML (such as m for the SSFE) the behavior of the SSFE family in channels with different $\kappa$ is thoroughly investigated. Some examples are given in Table 1, where the SNR gap (@ $10^{-5}$) to the exact ML solution is used to measure the performance. The examples are from the simulation over 3GPP suburban macro channel with 64-QAM and ½ Turbo coding. In Table 1 the second row the SNR gaps are shown for specific ranges of $\kappa$. First of all, for a given m the SNR gap increases monotonically with $\kappa$. Secondly, for a given $\kappa$ range the SNR gap decreases monotonically with m. Thirdly, for small $\kappa$ the SSFE with small m is already very close to the optimal ML solution. Moreover, from the histogram of $\kappa$ shown in FIG. 3, it can be seen that H with large $\kappa$ has very low probabilities. This implies that dynamically adjusting m brings significant work load reductions.

TABLE 1

| SNR Loss (AT BER $10^{-5}$) COMPARING TO ML DETECTION | | | | |
| --- | --- | --- | --- | --- |
| Range of $\kappa$ | m: [1111] | m: [1124] | m: [1248] | m: [124F] |
| $2^1$-$2^3$ | 0.5 dB | 0.1 dB | 0 dB | 0 dB |
| $2^2$-$2^4$ | 2.1 dB | 0.4 dB | 0 db | 0 dB |
| $2^3$-$2^5$ | 3.8 dB | 1.1 dB | 0.1 dB | 0 dB |
| $2^4$-$2^6$ | ∞ | 2.5 dB | 0.8 dB | 0.3 dB |
| $2^5$-$2^7$ | ∞ | ∞ | 4.2 dB | 0.9 dB |

In order to exploit the above observations one needs to estimate $\kappa$ and take a decision about m. The procedure of dynamic regulation on m is clearly an overhead that needs to be minimized. In one embodiment, the following techniques can be applied to reduce the overhead to a negligible level:

instead of performing exact SVD to derive $\kappa$, QRD based iterative eigenvalue calculation is used with only 2 iterations instead of calculating $\kappa$ for each subcarrier, a few subcarriers are calculated for each parallel SSFE block with $\kappa$ a fast table lookup is performed to select m.

In order to enable efficient implementation of the SSFE, $m_i=2^p$ is used for the search range. Hence, the set of search range {m} is a small discrete set and the estimation of $\kappa$ does not need to be very accurate. To minimize the computational complexity, no use is made of the exact SVD to analyze numerical properties of the channel matrix. Instead, an iterative approximate estimation is applied.

The approximate estimation of κ is based on iterative eigenvalue calculation with QR decompositions. Note that the singular values of H are equal to the square roots of eigenvalues of $HH^H$. Specifically, with QR decomposition, the iterative calculation is expressed as $$T_i = Q_i R_i$$

$$T_{i+1} = Q_i R_i \quad \text{(Eq. 9)}$$

Where $T_i = Q_i R_i$ is a QRD, $T_{i+1} = R_i Q_i$ is to construct the matrix for QRD in the next iteration, $T_0 = HH^H$. After several iterations, the diagonal elements in $T_{1+1}$ denoted by $[\lambda_{min}, \ldots, \lambda_{max}]$, are the estimated eigenvalues that converge over iterations. One can get $\kappa^2 = \lambda_{max}/\lambda_{min}$. Note that the singular values of H are equal to the square roots of eigenvalues of $HH^H$ and iterative eigenvalue calculation techniques can be applied to estimate $\kappa^2$. The convergence theory of QR and QR-like algorithms shows that the iterative eigenvalue calculation has a convergence speed linear to the ratios between eigenvalues. The histogram of $\log_2(\kappa)$ clearly indicates that these ratios are very large. Hence, the iterative method converges very fast. In experiments it is observed that only two iterations are already enough for estimating $\kappa_2$.

In addition to the approximate eigenvalue estimation with few iterations, also the frequency correlation of H is exploited to minimize the overhead of the dynamic regulation on m. The SSFE is parallelized over a block of subcarriers with channel matrixes $\{H_i, \ldots, H_{1+Nblk-1}\}$, where i is the first index of this block and $N_{blk}$ is the block size. The $\{m\}$ for all subcarriers in the parallelized block needs to be the same for all subcarriers. Hence, $\kappa^2$ can be averaged for the block and select m for the block according to the averaged $\kappa^2_{blk}$. Given that neighboring subcarriers in OFDM systems generally have very strong correlations, one can reduce the set of $\kappa^2(H_j)$ to average. Specifically, instead of having index $j \in \{i, i+1, i+N_{blk}-1\}$, a uniformly downsampled set is used $\{i, i+c, \ldots, i+nc, \ldots\}$, where c is the downsampling factor.

With $\kappa^2_{blk}$ one can take a decision for m: $\psi: \kappa^2_{blk} \to m$. Note that the set of $\{m\}$ is too large, so that one selects the Pareto-optimal elements from $\{m\}$ and forms a subset: $M = \{m_1, m_2, \ldots, m_{NM}\}$. Then, the decision for m is simplified as selecting an index k and a corresponding element $m_k$ in set M.

Motivated by the fact that SNR gaps of the SSFE family are sensitive to $\log_2(\kappa)$ (see Table 1), the following efficient method to rapidly determine k can be applied.

$$k = \begin{cases} 1, & \hat{k} < 1 \\ \hat{k}, & 1 \leq \hat{k} \leq k_{max} \\ k_{max}, & \hat{k} > k_{max} \end{cases}, k = \lfloor \log_2(\kappa) + \eta \rfloor \quad \text{(Eq. 11)}$$

$k_{max} \leq N_M$ ($N_M$ is the size of set M) is the index of the allowed minimum m, where η is a small constant optimized offline to ensure that SNR losses are acceptable when comparing to a case where only $m_{kmax}$ is applied. Clearly, alternating $k_{max}$ brings a flexible trade-off between work load and achievable BER performance.

Some performance results are now presented. First the BER (Bit Error Rate) and complexity reduction of the dynamic SSFE for OFDM systems is studied. Turbo coded transmissions are evaluated. The channel models specified by 3GPP LTE are used. For the sake of limited space, herein it is shown only ½ Turbo coded 64-QAM 4×4 transmissions in FIG. 4, the simulated channel is 3GPP suburban macro. Both dynamic SSFE and static SSFE are plotted. As mentioned before, the vector m associated with a dynamic SSFE specifies the maximum allowed search-range.

TABLE II complexity reduction rate comparing to static SSFE

| Dynamic SSFE | [1114] | [1124] | [1128] | [124F] |
|---|---|---|---|---|
| SNR loss @ $10^{-5}$ | <0.1 dB | <0.1 dB | <0.1 dB | <0.1 dB |
| η | 6.75 | 6 | 4.3 | 4.1 |
| Comp. reduction | 0.7069 | 0.8206 | 0.9333 | 0.9589 |

Figure 4:
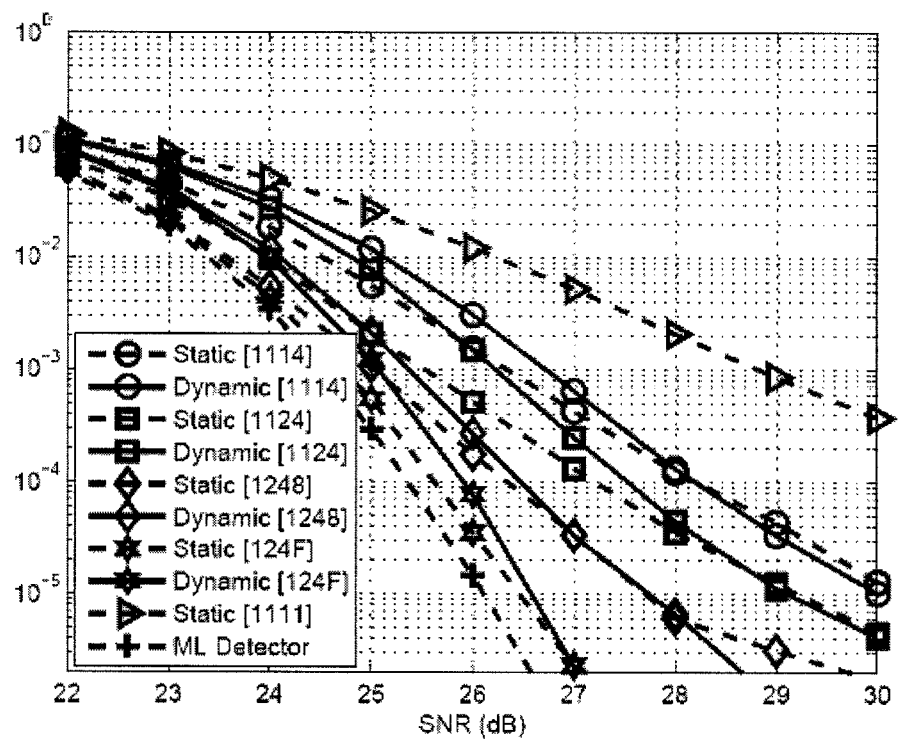
FIG. 4 represents a BER comparison.

From FIG. 4 one can see the SNR losses due to dynamic search-range scaling are very small. The η used in the simulation are optimized offline and listed in Table II, where the associated complexity reduction rates are listed as well. Herein the complexity is defined as number of visited nodes in tree-search. One can see that the run-time controller brings significant complexity reductions, especially for large m.

Figures 5, 6:
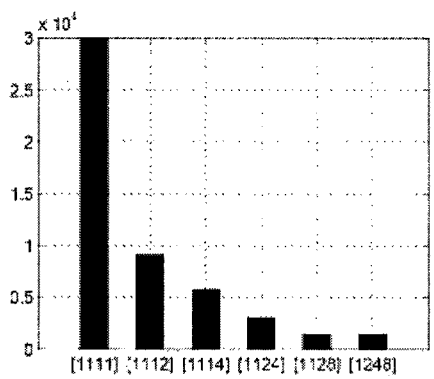
FIG. 5 represents histogram of SSFE instances for dynamic SSFE[1248]($\eta$=4.3).
FIG. 6 illustrates control flow transformation for fast enumeration.

In order to gain insight into the promising complexity reduction, the histogram of different SSFE instances is plotted in FIG. 5 for dynamic SSFE with m=[1248]. From the histogram it can be derived that, with a run-time controller, the dynamic SSFE search over small ranges very often. The SSFE instance with m=[1111] are mostly executed.

Some further details of an advantageous implementation of the SSFE are now provided. Suppose an SSFE implementation where there are 15 scalar signals, 16 vector signals and 3 matrix-signals. The 3 matrix-signals are dominating the memory footprints. The first matrix-signal is the PED. Each node in FIG. 1(b) is associated with a PED. In order to minimize the overhead of indirect addressing, the PED of the entire tree is stored in an one-dimension array with breadth-first ordering. Size of the array is $$1 + \sum_{i=1}^{Nt} \prod_{k=i}^{Nt} m_k.$$

For the tree in FIG. 1(b), the size of the PED array is 45. Memory position 0 holds the root node; position 1-4 hold the node 0-3 on level 4; position 5-12 hold the node 0-7 on level 3, .... In the parallel SSFE, the one-dimension PED array is simply extended to a two-dimensional array with size being $$\left(1 + \sum_{i=1}^{Nt} \prod_{k=i}^{Nt} m_k\right) \times \alpha,$$

where α is the number of vectorized blocks.

The second matrix-signal is the partial symbols ŝ. Just like the PED, every node in the tree is associated with a symbol. Hence, the same memory allocation and addressing scheme is applied as the PED. The third matrix-signal is the temporary signal used in the calculation of $b_i$, for which the same scheme can be applied as well.

With the above memory allocation scheme, the memory footprint of the parallel SSFE is pretty small. The PED is a 16-bit real number, ŝ is a 8-bit complex number, $b_i$ is a 16-bit complex number. When m=[1, 1, 2, 4] and α=16, the total memory space is only 3584 bytes, resulting in efficient memory accesses.

Although modern compilers often incorporate a lot of compiler transformations, pre-compiler transformations are still desired for aggressive optimizations. The pre-compiler transformation can better exploit application/algorithm information, giving important directives to the compiler for further optimizations.

Control Flow Transformations

First, control flow transformations are combined with data-flow transformations to exploit algorithmic information and profiling statistics. An example is shown in FIG. 6 for FE, where nP is the number of constellations to enumerate. The original code performs generic slicing, enumerates $p_1$, then checks whether to enumerate $p_2, p_2, \ldots; 4, p_5, \ldots, 8$ and so on. The generic slicing first slices to $\xi_i$ to $Q(\xi_i)$, then calculates $d=\xi_i-Q(\xi_i)$. Note that d is required to enumerate $p_{2,3}; : : :$ . Hence, vector signal d is calculated and stored even when nP=1.

The algorithmic information shows the percentage of cases with nP=1 is large. With m=[1, 1, 2, 4] the percentage is 57%. Hence, the code is transformed as that in the righthandside. In the new structure, cases with nP=1 are specially handled and optimized, so that the computation and load/store operations for vector signal $d=\xi_i-Q(\xi_i)$ are eliminated.

Strength Reductions and Algebraic Simplifications

These optimizations are performed for both computations and address-generations. Very importantly, the abundant flexibility in the algorithm is exploited to enable aggressive optimizations.

For instance, operation $n/m_i$ and $$n \Big/ \prod_1^k m_i$$

are extensively involved in the address-generations. Most DSP architectures do not have division units, so that divisions have to decomposed to a long and slow sequence of operations. In order to simplify address-generations, m is determined so that $m_i \in \{1, 2, 4, 8, 16\}$, corresponding to $\log_2(m_i) \in \{0, 1, 2, 3, 4\}$. This utilizes the full flexibilities regarding m in the SSFE. In this way, the implementation of $n=m_i$ can be transformed as left-shifting n by $\log_2(m_i)$ bits. Similarly, the $$n \Big/ \prod_1^k m_i$$

is transformed as left-shifting n by $$\sum_1^k \log 2(m_i) \text{bits.}$$

Other Transformations

Many other transformations are performed as well. Common expression reductions are performed for both calculation and address generation. Because of the vector-parallelism in the parallel SSFE, there are many shared subexpression in address-generations. In addition, many memory-accesses inside individual SSFE are consecutive. Hence, intermediate variables are introduced to reduce the overhead of address generation. Moreover, the variable expansion is applied to enable parallelization; the pointer aliasing is applied to reduce the loop-dependency-bound and improve the efficiency of software-pipelining.

Figure 7:
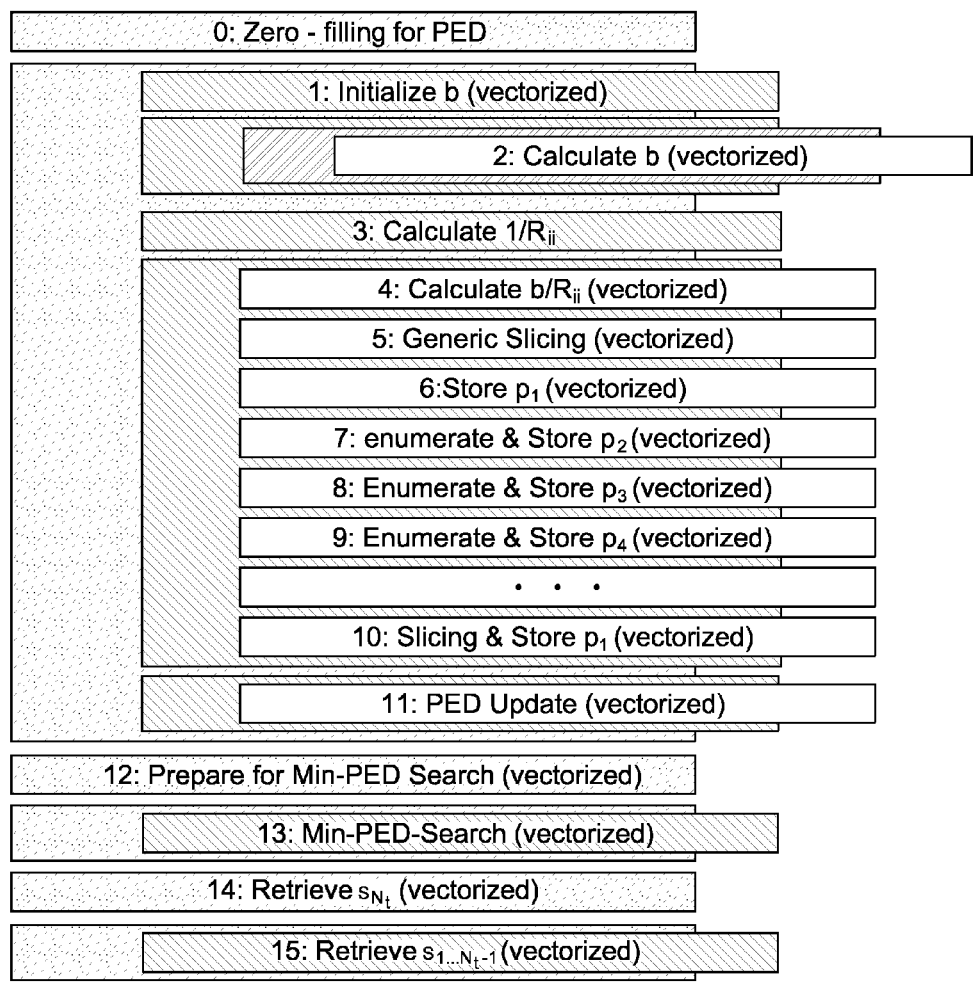
FIG. 7 illustrates loop structures of the parallelized SSFE.

The structure of the code is shown in FIG. 7, where loops are depicted by layered boxes. In order to save the space, loops for $m_i>4$ are not shown and control structure is not shown neither. Note that not all loops are invoked in an execution. Most of the innermost loops implement vector parallelism and are highly regular. Below it is shown that the SSFE is as efficient as the FFT on real-life architectures.

Figure 8:
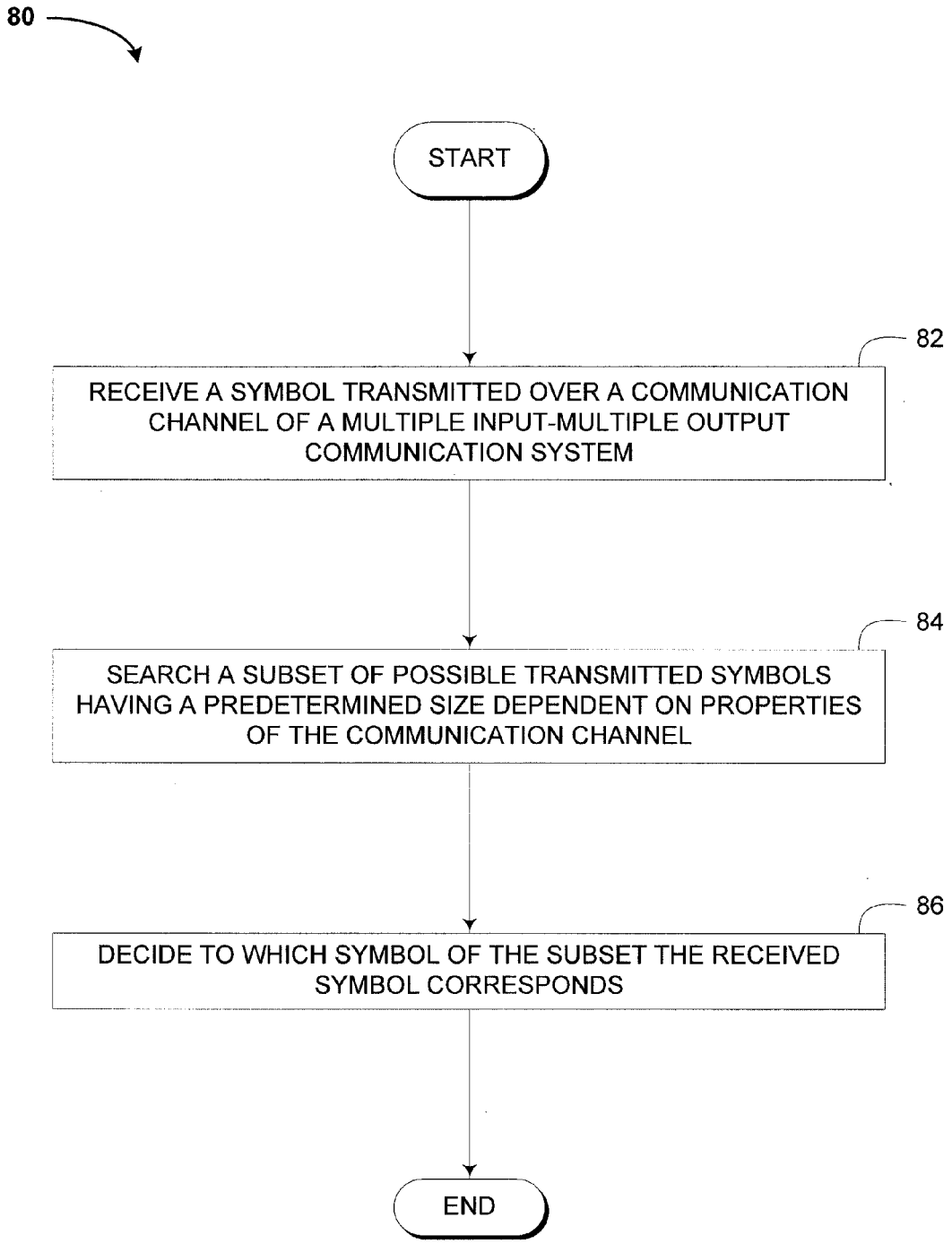
FIG. 8 is a flowchart of one embodiment of a method of detecting a symbol transmitted over a communication channel in a multiple input-multiple output communication system.

FIG. 8 shows a flowchart of one embodiment of a method of detecting a symbol transmitted over a communication channel in a multiple input-multiple output communication system. Depending on the embodiment, certain steps of the method may be removed, merged together, or rearranged in order. The method 80 starts at a block 82, wherein a symbol transmitted over a communication channel of a multiple input-multiple output communication system is received. The method then moves to a block 84, wherein a subset of possible transmitted symbols are searched. The subset has a predetermined size dependent on properties of the communication channel. Moving to a block 86, it is determined to which symbol of the subset the received symbol corresponds.

Figure 9:
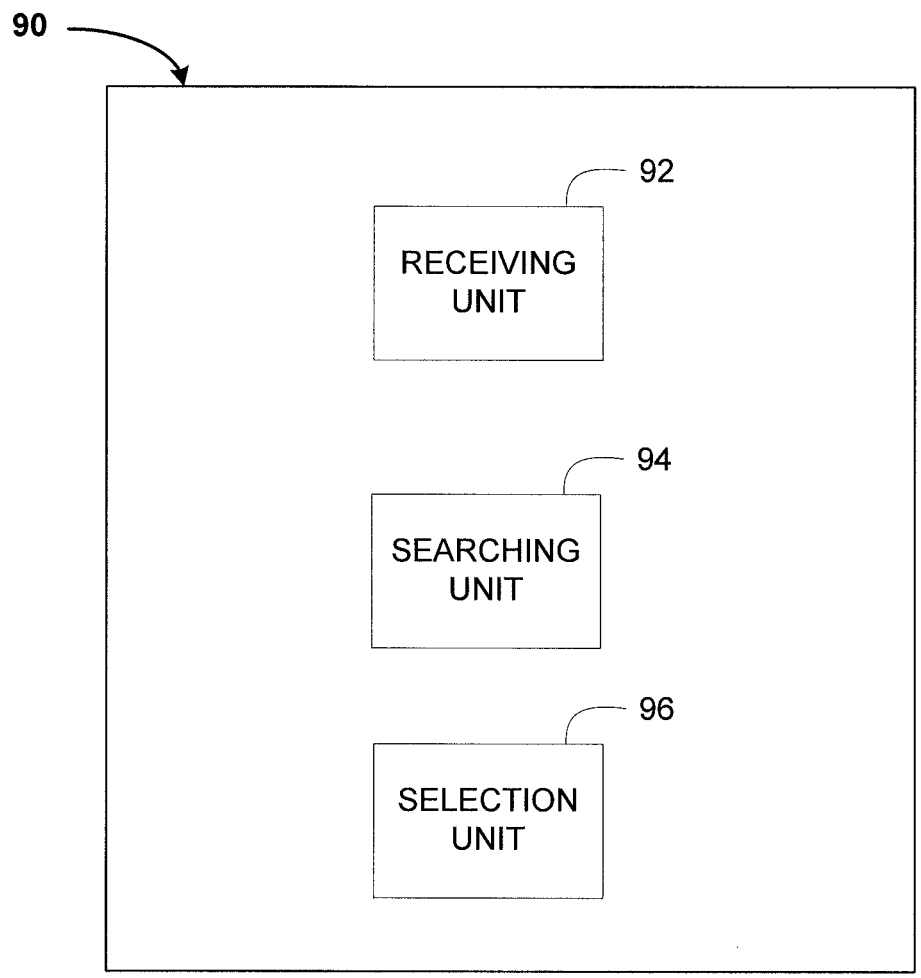
FIG. 9 is a block diagram illustrating one embodiment of a device for detecting a symbol transmitted over a communication channel in a multiple input-multiple output communication system.

FIG. 9 shows a block diagram illustrating one embodiment of a device for detecting a symbol transmitted over a communication channel in a multiple input-multiple output communication system. The device 90 comprises a receiving unit 92 configured to receive a symbol transmitted over the communication channel. The device 90 may further comprise a searching unit 94 configured to search a subset of possible transmitted symbols. The subset has a predetermined size dependent on properties of the communication channel. The device 90 may further comprise a selection unit 96 configured to select the symbol of the subset to which the received symbol corresponds.

Although systems and methods as disclosed, are embodied in the form of various discrete functional blocks, the system could equally well be embodied in an arrangement in which the functions of any one or more of those blocks or indeed, all of the functions thereof, are realized, for example, by one or more appropriately programmed processors or devices. It is to be noted that the processor or processors may be a general purpose, or a special purpose processor, and may be for inclusion in a device, e.g. a chip that has other components that perform other functions. Thus, one or more aspects of the present invention can be implemented in digital electronic circuitry, or in computer hardware, firmware, software, or in combinations of them. Furthermore, aspects of embodiments of the invention can be implemented in a computer program product tangibly embodied in a transitory or non-transitory computer-readable medium carrying machine-readable code for execution by a programmable processor. Method steps in the foregoing embodiments may be performed by a programmable processor executing instructions to perform functions of those aspects of the invention, e.g. by operating on input data and generating output data.

Although the present invention has been illustrated by reference to specific embodiments, it will be apparent to those skilled in the art that the invention is not limited to the details of the foregoing illustrative embodiments, and that the present invention may be embodied with various changes and modifications without departing from the spirit and scope thereof. The present embodiments are therefore to be considered in all respects as illustrative and not restrictive. In other words, it is contemplated to cover any and all modifications, variations or equivalents that fall within the spirit and scope of the basic underlying principles. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfill the functions of several means. The terms "first", "second", third", "a", "b", "c", and the like, when used in the description are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to including any specific characteristics of the features or aspects of the invention with which that terminology is associated.

While the above detailed description has shown, described, and pointed out novel features of the invention as applied to various embodiments, it will be understood that various omissions, substitutions, and changes in the form and details of the device or process illustrated may be made by those skilled in the technology without departing from the spirit of the invention. The scope of the invention is indicated by the appended claims rather than by the foregoing description. All changes which come within the meaning and range of equivalency of the claims are to be embraced within their scope.

What is claimed is:

1. A method of detecting a symbol transmitted over a communication channel in a multiple input-multiple output communication system, the method comprising:
    receiving a symbol transmitted over a communication channel of a multiple input-multiple output communication system;
    searching a subset of possible transmitted symbols, the subset having a predetermined size dependent on properties of the communication channel, the subset determined via a distributed local optimization of the likelihood of successful symbol detection at various levels of a search tree; and
    deciding to which symbol of the subset the received symbol corresponds,
    wherein a plurality of symbols are received, and wherein the process of searching for at least two of the received symbols is performed in parallel paths.

2. The method as in claim 1, wherein the searching comprises selecting the closest constellation to a point determined by the properties of the communication channel.

3. The method as in claim 1, wherein the number of parallel paths is adaptable.

4. The method as in claim 1, wherein the multiple input-multiple output communication system is an OFDM system.

5. The method as in claim 1, further comprising estimating a parameter providing an indication of the properties of the communication channel.

6. The method as in claim 5, wherein the predetermined size is read from a lookup table after estimating the parameter.

7. The method as in claim 1, wherein the predetermined size is a power of 2.

8. The method as in claim 1, wherein the properties of the communication channel are determined via an iterative approximate estimation process.

9. A device for detecting a symbol transmitted over a communication channel in a multiple input-multiple output communication system, the device comprising:
    a receiving unit configured to receive a symbol transmitted over the communication channel;
    a searching unit configured to search a subset of possible transmitted symbols, the subset having a predetermined size dependent on properties of the communication channel, the subset determined via a distributed local optimization of the likelihood of successful symbol detection at various levels of a search tree; and
    a selection unit configured to select the symbol of the subset to which the received symbol corresponds,
    wherein the receiving unit is configured to receive a plurality of symbols, and wherein the searching unit is configured to perform searching of at least two of the received symbols in parallel paths.

10. The device as in claim 9, wherein the device is further arranged for parallel processing.

11. The device as in claim 9, further comprising a storage unit configured to store at least the subset of possible transmitted symbols.

12. The device as in claim 9, further comprising a run-time controller configured to perform dynamic adaptation of parameters in response to changed properties of the communication channels.

13. The device as in claim 9, comprising a transformation unit configured to perform pre-compiler transformations.

14. The device as in claim 9, wherein the predetermined size is a power of 2.

15. The device as in claim 9, wherein the properties of the communication channel are determined via an iterative approximate estimation process.

16. The device as in claim 9, wherein the searching unit is configured to select the closest constellation to a point determined by the properties of the communication channel.

17. A multiple input-multiple output communication system comprising a device as in claim 9.

18. A device for detecting a symbol transmitted over a communication channel in a multiple input-multiple output communication system, the device comprising:
    means for receiving a symbol transmitted over the communication channel;
    means for searching a subset of possible transmitted symbols, the subset having a predetermined size dependent on properties of the communication channel, the subset determined via a distributed local optimization of the likelihood of successful symbol detection at various levels of a search tree; and
    means for selecting the symbol of the subset to which the received symbol corresponds,
    wherein the receiving means is configured to receive a plurality of symbols, and wherein the search means is configured to perform searching for at least two of the received symbols in parallel paths.

* * * * *